(12) United States Patent
Sivonen et al.

(10) Patent No.: US 9,611,586 B2
(45) Date of Patent: Apr. 4, 2017

(54) METHOD AND A SYSTEM FOR MANUFACTURING CELLULOSE MATERIAL

(71) Applicant: UPM-KYMMENE CORPORATION, Helsinki (FI)

(72) Inventors: Eino Sivonen, Ruutana (FI); Kyösti Valta, Tampere (FI); Markus Nuopponen, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/359,507

(22) PCT Filed: Nov. 23, 2012

(86) PCT No.: PCT/FI2012/051164
§ 371 (c)(1),
(2) Date: May 20, 2014

(87) PCT Pub. No.: WO2013/076376
PCT Pub. Date: May 30, 2013

(65) Prior Publication Data
US 2014/0323714 A1     Oct. 30, 2014

(30) Foreign Application Priority Data

Nov. 23, 2011  (FI) .................................... 20116163

(51) Int. Cl.
| | | |
|---|---|---|
| *C08B 11/20* | (2006.01) | |
| *C08B 1/00* | (2006.01) | |
| *C08B 1/02* | (2006.01) | |
| *D21C 3/04* | (2006.01) | |
| *C08B 1/06* | (2006.01) | |
| *C08B 11/12* | (2006.01) | |
| *C08B 3/06* | (2006.01) | |
| *D21C 3/02* | (2006.01) | |
| *D21C 3/22* | (2006.01) | |
| *D21H 11/18* | (2006.01) | |

(52) U.S. Cl.
CPC .................. *D21C 3/04* (2013.01); *C08B 1/06* (2013.01); *C08B 3/06* (2013.01); *C08B 11/12* (2013.01); *D21C 3/02* (2013.01); *D21C 3/22* (2013.01); *D21H 11/18* (2013.01)

(58) Field of Classification Search
CPC .............. C08B 11/20; C08B 1/00; C08B 1/02
USPC ............................................ 536/97, 98, 124
See application file for complete search history.

(56) References Cited

U.S. PATENT DOCUMENTS

| 3,723,413 A | 3/1973 | Chatterjee et al. |
| 6,602,994 B1 | 8/2003 | Cash et al. |
| 2005/0054848 A1 | 3/2005 | Valta et al. |

FOREIGN PATENT DOCUMENTS

| WO | WO 00/47628 A2 | 8/2000 |
| WO | 2011/120533 A1 | 10/2011 |

OTHER PUBLICATIONS

May 27, 2015 Extended Search Report issued in European Patent Application No. 12852416.2.
Mar. 24, 2014 International Preliminary Report on Patentability issued in International Application No. PCT/FI2012/051164.
Apr. 16, 2013 International Search Report issued in International Application No. PCT/FI2012/051164.

*Primary Examiner* — Fereydoun G Sajjadi
*Assistant Examiner* — Everett White
(74) *Attorney, Agent, or Firm* — Nixon Peabody LLP; Leena H. Karttunen Contarino; Elizabeth Baio (57) ABSTRACT

The invention relates to a method for manufacturing cellulose material, the method comprising introducing cellulose fibers as raw material pulp (1) to a system, adding an alkalizing agent into the system in order to absorb the alkalizing agent into the cellulose fibers (1), adding an anionic agent into the system in order to absorb said agent into the cellulose fibers (1), feeding the cellulose fibers (1) to a sieve plate press (6), performing a reaction between the cellulose fibers and the anionic agent at least partly in the sieve plate press (6) in order to produce anionized cellulose fibers having a degree of substitution between 0.05 and 0.35, wherein the reaction is performed at least partly at a consistency of at least 50%. In addition, the invention relates to a system for manufacturing cellulose material and to fibril cellulose produced from anionized cellulose fibers.

20 Claims, 6 Drawing Sheets

METHOD AND A SYSTEM FOR MANUFACTURING CELLULOSE MATERIAL

FIELD OF THE INVENTION

This invention relates to a method and a system for manufacturing cellulose material. In addition, this invention relates to fibril cellulose material.

BACKGROUND OF THE INVENTION

Cellulose, which is an abundant natural raw material, is a polysaccharide consisting of a linear chain of several hundreds to ten thousand linked D-glucose units. Cellulose fibers can be refined with a refiner or a grinder to produce refined cellulose material, for example fibril cellulose material. Typically, the production of refined cellulose material, especially fibril cellulose material, requires a significant amount of beating energy. Therefore, there may be an efficiency problem in the fibril cellulose production.

Due to the above mentioned problem, it has been found to be beneficial to add some compounds to increase the efficiency of the refining step of the cellulosic material production. However, there is still a need for a new solution for increasing the efficiency of the cellulose material production.

SUMMARY OF THE INVENTION

The present invention discloses a new solution for manufacturing fibril cellulose material. In the method, it is possible to use cellulose fibers as raw material and to treat said cellulose fibers in a sieve plate press, preferably with certain chemicals, to achieve cellulose material.

Aspects of the invention are characterized by what is stated in the independent claims 1, 10 and 12. Various embodiments of the invention are disclosed in the dependent claims.

The inventors of the present invention have surprisingly found a way to produce cellulose material with increased production efficiency. Advantageously the solution comprises a step in which a first chemical, i.e. an alkalizing agent, is dosed and absorbed into the cellulose raw material before or during dosing of a second chemical, i.e. an anionic agent, preferably sodium monocholoroacetate. In addition, the solution comprises at least one sieve plate press, wherein the mixture comprising the cellulose raw material and said at least two chemicals is typically compressed and mixed. Moreover, the sieve plate press used according to the present invention typically removes internal bonds and/or bonds between cellulose fibers.

According to an advantageous embodiment of the invention, the method comprises at least one kind of a pretreatment step, after which the alkalizing agent and the second chemical are preferably dosed. In this case, the system advantageously comprises
  at least one prerefiner in order to refine the cellulose fiber material, which prerefiner is placed before the sieve plate press, and/or
  at least one device for increasing the dry matter content of the cellulose fiber material. Advantageously, the manufactured cellulose material is refined into fibril cellulose material.

According to an advantageous embodiment of the invention, the produced cellulose material has a degree of substitution between 0.05 and 0.35 carboxymethyl groups per anhydroglucose unit, more preferably between 0.15 and 0.25 carboxymethyl groups per anhydroglucose unit.

According to an advantageous embodiment of the invention, the method comprises at least some of the following steps:
  introducing cellulose fibers to a system,
  pretreating the cellulose fibers,
  dosing at least two chemicals to the system, advantageously the dosage of the chemicals is carried out in a fluidized bed type mixer,
  conveying the cellulose fibers to a sieve plate press,
  performing a reaction between the cellulose fibers and the chemicals at least partly in the sieve plate press, wherein the reaction is performed at a consistency of at least 50%,
  heating the treated material in a heating device,
  washing the material (for example, diluting and drying the materials), and
  refining the reacted cellulose fibers in a refiner in order to produce fibril cellulose material.

According to an advantageous embodiment of the invention, the system comprises at least some of the following means:
  means for introducing cellulose fibers as raw material to the system,
  at least one pretreatment device in order to treat the material before the material is fed to a sieve plate press,
  the sieve plate press,
  means for dosing at least two chemicals to the system before the sieve plate press and/or in the sieve plate press; preferably, the dosage of the chemicals is carried out in a fluidized bed type mixer;
  a feeding device for feeding the cellulose fibers to the sieve plate press,
  means for performing a reaction between the cellulose fibers and the chemical(s) at least partly in the sieve plate press,
  a heating device, such as an oven, in order to increase the temperature of the material,
  means for washing the material (for example, means for diluting and drying the material), and
  a refiner for refining the reacted cellulose fibers in order to produce fibril cellulose material.

Advantageously, cellulose fibers are treated with an anionic agent in order to anionize the fibers. The cellulose fiber may be treated, for example, with certain chemicals in order to form a lightly carboxymethylated cellulose having such a degree of substitution that it is not soluble in water. According to this advantageous embodiment of the invention, an alkalizing agent and the anionic agent, such as monochloroacetic acid, preferably sodium monocholoroacetate (SMCA), are absorbed into cellulose raw material, after which the cellulose raw material is allowed to react with the dosed chemicals in a sieve plate press at a high dry matter content. The used cellulose raw material preferably comprises chemical pulp, for example wood pulp. The alkalizing agent is most preferably sodium hydroxide.

The anionized cellulose material may be refined into fibril cellulose material. In this case, the fibril cellulose may be dried in order to increase the dry matter content of the fibril cellulose. For storage and/or transportation, the dry matter content of the produced fibril cellulose is advantageously at least 20%, for example between 50 and 70%. Thanks to the anionization step of the present invention, the manufactured and at least partly dried fibril cellulose may be redispersed in water easier than before. Therefore, the dried fibril cellulose may be, for example, powder that can be redispersed in water for the later usage of said fibril cellulose.

DESCRIPTION OF THE DRAWINGS

In the following, the invention will be illustrated by drawings in which.

DETAILED DESCRIPTION OF THE INVENTION

In the following disclosure, all percentages are by weight, if not indicated otherwise.

Figure 1:
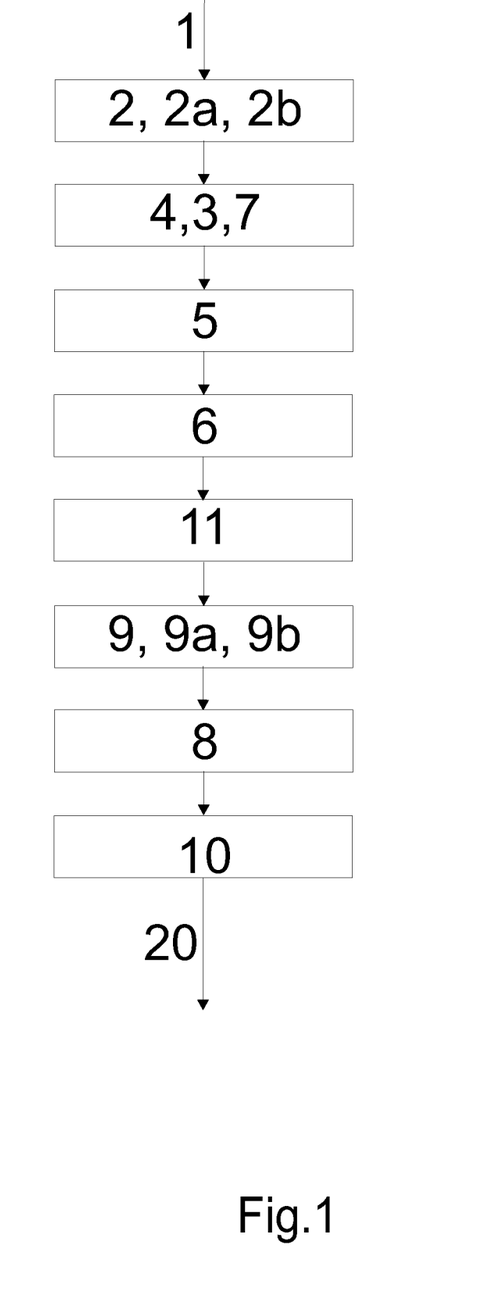
FIG. 1 shows schematically some example steps of the invention.
Figure 2:
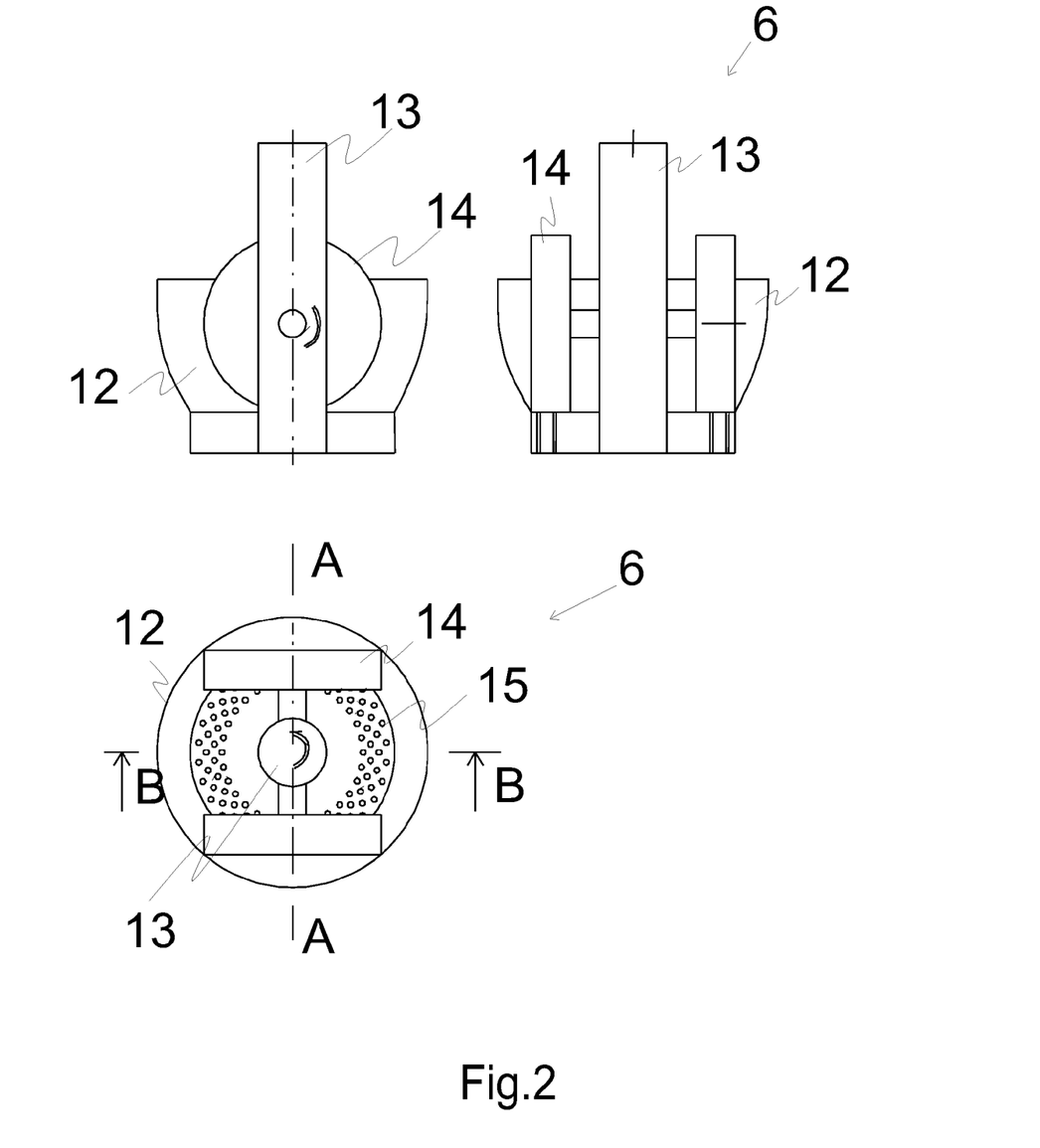
FIGS. 2a-2c show an example embodiment of a sieve plate press.

FIGS. 1 to 3 show some advantageous embodiments of the invention. The following reference numbers are used in this application:

1 cellulose pulp,
2 pretreatment device,
2a prerefiner,
2b predryer,
3 first chemical inlet,
4 chemical mixer, for example a fluidized bed type mixer,
5 feeding device for a sieve plate press,
6 sieve plate press,
7 second chemical inlet,
8 refiner,
9 washing treatment, washing step,
9a dilution step,
9b drying step, for example, filtrating step and/or pressing step,
10 finishing device,
11 heating device,
12 stationary vat of the sieve plate press,
13 drive shaft of the sieve plate press,
14 rolls of the sieve plate press,
15 sieve plate matrix, and
20 fibril cellulose material.

Natural cellulose is a linear compound with a simple chemical functionality having 3 hydroxyl groups for a glucose unit. The term "cellulose raw material" refers to any cellulose raw material source that can be used in the production of chemically and/or mechanically treated cellulose fibers. The raw material can be based on any plant material that contains cellulose. The plant material may be wood. The wood can be from softwood trees such as spruce, pine, fir, larch, douglas-fir or hemlock, or from hardwood trees such as birch, aspen, poplar, alder, eucalyptus or acasia, or from a mixture of softwood and hardwood. Nonwood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed.

The term "chemical (cellulose) pulp" refers to cellulose fibers, which are isolated from any cellulose raw material by a chemical pulping process. Therefore, lignin is at least mostly removed from the cellulose raw material.

Chemical cellulose pulp is preferably sulfate wood pulp. The used chemical cellulose pulp may be unbleached or bleached. Typically, the diameter of the fibers varies from 15 to 25 µm and the length exceeds 500 µm, but the present invention is not intended to be limited to these parameters. The term "mechanical (cellulose) pulp" refers to cellulose fibers, which are isolated from any cellulose raw material by a mechanical pulping process. The cellulose fibers used in this invention preferably comprise mechanically and/or chemically treated cellulose fibers. Herein they are also referred as "raw material pulp".

The term "cellulosic material" refers to any cellulose material including cellulose fibers and/or material produced from the cellulose fibers.

The term "fibril cellulose" refers to a collection of isolated cellulose microfibrils or microfibril bundles derived from cellulosic material. There are several widely used synonyms for fibril cellulose. For example: nanofibrillated cellulose (NFC), nanocellulose, microfibrillar cellulose, nanofibrillar cellulose, cellulose nanofiber, nano-scale fibrillated cellulose, microfibrillated cellulose (MFC), or cellulose microfibrils. The term "fibril cellulose" and the related terms refer to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 micrometer. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of microfibrillar cellulose from cellulose raw material, cellulose pulp, or refined pulp is normally carried out with suitable equipment such as a refiner, grinder, homogenizer, colloider, friction grinder, ultrasound sonicator, fluidizer such as microfluidizer, macrofluidizer or fluidizer-type homogenizer. In this case the nanofibrillar cellulose is obtained through disintegration of plant cellulose material and can also be called "nanofibrillated cellulose".

Fibril cellulose described in this application is not the same material as the so called cellulose whiskers, which are also known as: cellulose nanowhiskers, cellulose nanocrystals, cellulose nanorods, rod-like cellulose microcrystals or cellulose nanowires. In some cases, similar terminology is used for both materials, for example by Kuthcarlapati et al. (Metals Materials and Processes 20(3):307-314, 2008) where the studied material was called "cellulose nanofiber" although they clearly referred to cellulose nanowhiskers. Typically these materials do not have amorphous segments along the fibrillar structure as fibril cellulose, which leads to more rigid structure. Cellulose whiskers are also shorter than fibril cellulose.

Characterization for two fibril cellulose grades is presented in Table 1.

Viscosity of the Fibril Cellulose:

The apparent viscosity is measured with a Brookfield viscometer (Brookfield viscosity) or another corresponding apparatus. Suitably a vane spindle (number 73) is used. There are several commercial Brookfield viscometers available for measuring apparent viscosity, which all are based on the same principle. Suitably RVDV spring (Brookfield RVDV-III) is used in the apparatus. As a result, a viscosity graph is obtained with varying shear rate. A low rotational speed 10 rpm is used. The viscosity is measured at a concentration of 0.8%, unless indicated otherwise.

Attention should also be paid to obtain dilutions of fibril cellulose having a constant standard concentration to be able to compare the results correctly. Further, it is preferable that flocking is avoided. Yield stress of the fibril cellulose can be calculated from the viscosity measurement.

Turbidity of the Fibril Cellulose:

Turbidity may be measured quantitatively using optical turbidity measuring instruments. There are several commercial turbidometers 5 available for measuring quantitatively turbidity. In the present case the method based on nephelometry is used. The units of turbidity from a calibrated nephelometer are called Nephelometric Turbidity Units (NTU). The measuring apparatus (turbidometer) is calibrated and controlled with standard calibration samples, 10 followed by measuring of the turbidity of the diluted NFC sample.

In the method, a nanofibrillar cellulose sample is diluted within a liquid, preferably in water, to a concentration below the gel point of said nanofibrillar cellulose, and turbidity of the diluted sample is measured. Said 15 concentration where the turbidity of the nanofibrillar cellulose samples is measured is 0.1%. The mean value and standard deviation are calculated from the obtained results, and the final result is given as NTU units.

Charge of the fibril cellulose: Charge can be determined by conductometric titration.

TABLE 1

Characterization of two anionic fibril cellulose grades

| Grade | Brookfield viscosity (mPas) | Turbidity (NTU) | Charge (ieq/g) | Yield stress (Pa) |
|---|---|---|---|---|
| Anionic medium | 5000-15000 | 100-200 pref. 100-150 | between −200 and −400 | 4-12 Pref. 5-8 |
| Anionic premium | 15000-40000 | 25-100 pref. 30-60 | between −300 and −800 | 8-90, Pref. 20-70 |

According to the present invention, cellulose fibers are treated
 chemically with certain chemicals, and
 mechanically with a sieve plate press
in order to produce anionized cellulosic material.

Advantageously the anionization is implemented by a carboxymethylating method, wherein the penetration of a first chemical, i.e. an alkalization agent, and a second chemical, i.e. an anionic agent, such as monochloroacetate or a salt thereof, in the cellulose is implemented at least partly in a sieve plate press 6. Typically in the sieve press under mechanical working, the fibre bundles are disintegrated, the pores in the fibre are opened, and the liquid penetrates into the fibre. The alkalization agent activates the fibre and contributes to the penetration of the second chemical. The sieve plate press 6 is used, among other things, for homogenization of the mixture of the cellulose pulp and chemicals. After the treatment, the treated cellulose fibers are advantageously fibrillated into fibril cellulose.

Advantageously the reaction between the chemicals and the cellulose fibers is carried out in a mixture, wherein the liquid content is not higher than 30%, preferably not higher than 50% and more preferably not higher than 60%.

The functional properties of the produced cellulosic material depend on the degree of substitution (DS) of the cellulose structure. The degree of substitution is predetermined in order to achieve cellulosic material that is not soluble in water. According to an advantageous embodiment of the present invention, it is possible to use almost dry chemical pulp as a raw material and to treat said almost dry chemical pulp with certain chemicals to achieve lightly carboxymethylated cellulose which is further refined into fibril cellulose material.

The produced fibril cellulose material has a degree of substitution preferably at least 0.05, more preferably at least 0.15, and most preferably at least 0.20 carboxymethyl groups per anhydroglucose unit. In addition, the produced fibril cellulose material has a degree of substitution preferably not higher than 0.35, more preferably not higher than 0.30 carboxymethyl groups per anhydroglucose unit.

The cellulosic material production can be controlled by the quantity of chemicals, by the degree of mechanical working, and by the time and the temperature used for the chemical reactions.

The cellulose fibers 1 used in the invention as a cellulose pulp can be supplied, for example, in the form of cellulose bales or cellulose rolls. However, other cellulose raw materials in fiber form can also be used. According to an advantageous embodiment of the invention, the cellulose pulp 1 comprises cellulose rolls. In that case, the amount of the produced cellulosic material can be controlled by the speed of unwinder(s) used for said rolls.

The cellulosic material process according to an embodiment of the invention has advantageously at least one prerefiner step for prerefining the cellulose fibers 1. Therefore, according to an advantageous embodiment of the invention, the system comprises a prerefiner 2a which is used for a refining step of the cellulose fibers 1, such as a cellulose bale or a cellulose roll. According to an advantageous embodiment, the cellulose fibers 1 are prerefined before a first chemical, such as sodium hydroxide, and a second chemical, such as sodium monochloroacetate, are dosed. The prerefining of the cellulose fibers 1 can be carried out with a device capable of separating and/or making the cellulose fibers shorter. The prerefiner device 2a is preferably a refiner, such as a hammer mill, a fluffing machine, a rotary cutter, or a disk refiner. If the cellulose pulp 1 comprises cellulose bales, a bale breaker and/or fluffing machine may be preferably used. In the case of cellulose rolls, the prerefiner 2 is preferably a hammer mill. Thanks to the prerefiner 2 used, it is possible to increase the specific surface area of the cellulose pulp fibers for chemical-fiber reactions. The average particle size of the prerefined cellulose material is preferably 100 mm$^2$ at the most.

The raw material pulp 1 has a dry matter content of at least 25%, more preferably at least 30%. However, the dry matter content of the cellulosic material to be conveyed to the sieve plate press 6 is preferably at least 50%. Therefore, if the dry matter content of the raw material pulp 1 is lower than 50%, the system preferably comprises a predryer 2b in order to increase the dry matter content of the raw material pulp 1 before said cellulose material is conveyed to the sieve plate press 6. The predryer 2b is preferably a heating device (such as an oven) or a filtrating device. After the predrying treatment in at least one predryer 2b, the dry matter content of the cellulose material is preferably at least 50%.

According to an advantageous embodiment of the invention, the dry matter content of the cellulose material 1 before the first chemical dosage is at least 40%, more preferably at least 50% or at least 60% or at least 70%, and most preferably at least 80% or at least 85%. Due to the high dry matter content, reactions with water or other liquid are mostly avoided. Therefore, the amount of the chemicals needed for the process is quite small. The chemicals are dosed into the cellulose material in such a proportion that the dry matter content of the mixture after said dosing is at least 50%, more preferably at least 60% or at least 70% and most preferably at least 80% or at least 85%.

The first chemical added to the system, i.e. an alkalization agent, may be an alkali metal hydroxide, and it is used for activating the pulp. In other words, the alkalization agent activates the fibers and contributes to the penetration of the second chemical into the fibers. The alkalization agent can be added to the reaction mixture, for example, in an aqueous solution and/or in a dry state. It is preferably selected from the group comprising hydroxides and oxides, such as $Mg(OH)_2$, NaOH, LiOH, $Ca(OH)_2$ and CaO. Most preferably said first chemical (i.e. the alkalization agent) is sodium hydroxide NaOH.

Advantageously, the amount of the alkalization agent used is between 1 and 20 w-%, more preferably between 1 and 10 w-% from the cellulose raw material used.

The second chemical, i.e. the main chemical added to the system is an anionic agent, preferably monochloroacetic acid or a salt thereof, and most preferably sodium monochloroacetate. The second chemical can be added to the system in a dry state and/or in an aqueous alkaline solution and/or in a gas form in order to produce cellulosic material. If the raw material pulp 1 used for the treatment is so called "never dried pulp", the second chemical is added to the system preferably in a dry state as a powder. If the dry matter content of the cellulose material used for the treatment is at least 60%, the second chemical is advantageously added to the system in an aqueous alkaline solution, such as an 80% dispersion of sodium monochloroacetate in water. The amount of the second chemical used, in the case of sodium monochloroacetate, is preferably between 1 and 30 w-%, more preferably between 2 and 15 w-%.

The dry matter content of the cellulose material after the addition of the first chemical and the second chemical into the system is preferably at least 50%, more preferably at least 70%. Therefore, if the dry matter content of the cellulose fibers before the chemical addition is lower than 50%, the chemicals are preferably added in a dry state, for example as a dry power.

The system according to the invention may comprise at least one feeding device 5 for at least one sieve plate press 6. The feeding device 5 may be, for example, a double-screw feeder or a vibrating feeder. Preferably, the feeding device 5 is the double-screw feeder.

The system according to the invention comprises at least one sieve plate press 6, in which the mixture is compressed, rubbed and stretched several times. In addition, thanks to the thermal energy produced during the mechanical working and/or introduced in the system from the outside, the temperature of the mixture can be raised to such a level that the actual reaction can also be started and performed, at least partly, already in said sieve plate press 6. Thus, the sieve plate press 6 may also be used, at least partly, for the reaction by running the cellulose fibers several times through the press. The cellulose fibers are advantageously run from 1 to 10 times, more preferably 3 to 5 times through said sieve plate press 6. This may involve the change of the sieve plate after a few compression times, or the use of two or three different presses one after the other.

There are several kinds of sieve plate press devices in the market. Advantageously, the sieve plate press 6 is provided with a drive shaft 13 placed in a stationary vat 12, a horizontal roll axle being mounted on the shaft and rolls 14 being journalled at the ends of the axle. The bottom of the vat is a sieve plate matrix 5, against which the rolls roll when the drive shaft is rotated. The sieve plate matrix 5 is exchangeable. The side walls of the vat and the matrix form a jacket, through which a possible heat transfer medium can be led. The rolls can also be equipped with heat transfer devices. The rotating rolls press the pulp supplied into the vat through openings in the sieve plate matrix, whereupon the pulp is compressed into pellets. The pressing efficiency depends on the diameter and the length of the channels, the number of channels per area, as well as the press load caused by the rolls on the pulp over matrix.

Thanks to the sieve plate press used, the mechanical treatment may be more efficient compared to conventional mechanical treatments. The sieve plate press typically causes a unique treatment wherein the fibers are treated gently by compressing, rubbing and stretching several times. Therefore, due to the sieve plate press, the fibers can also be subjected to an efficient chemical treatment. The sieve plate press may also be a quite inexpensive solution in view of investment and the manufacturing process.

The sieve plate working is carried out with a continuously operating sieve plate device, in which the feeding may be performed by a double-screw feeder. The feed rate is selected so that no material will be accumulated in front, on top, or on the sides of the wheels, but all the fed material is pressed through the holes in the matrix. On the outflow side of the matrix, the material is cut with a cutter to granules. The jacket can preferably be cooled by an external water circulation.

Advantageously, the particle size of the cellulose material is at most 1 $mm^2$ after the treatment in the sieve plate press 6.

According to an example embodiment of the invention, the dry matter content of the mixture in the sieve plate press is at least 40%, preferably at least 60% or at least 80%.

According to an example embodiment of the invention, the consistency of the mixture can be controlled in the sieve plate press 6. Therefore, the sieve plate press 6 can also be used to add or to remove liquid(s) from the mixture. Removing of the liquid(s) can be carried out, for example, using a vacuum technique.

In an example embodiment, the addition of at least one chemical is carried out in the sieve plate press 6 or before the sieve plate press 6. The dosage of chemicals is advantageously carried out in a fluidized bed type mixer. Advantageously, both chemicals, i.e. the first chemical and second chemical, are dosed separately one after the other. It is possible to add, for example, gaseous chemical(s) and/or to spray chemical(s) and/or to add chemical(s) as dry powder to the system. Absorption of the chemical(s) into the cellulose fibers is preferably enhanced at least partly in the sieve plate press 6. Therefore, the dosed chemical(s) are capable of penetrating into the cellulose fibers at least partly in said sieve plate press.

The method according to the present invention comprises a first chemical dosage for the first chemical, in which the alkalization agent is preferably dosed to the system using a first chemical inlet 3.

The alkalization agent may be dosed to the system using a nozzle spray technique, wherein the chemical is dosed as small drops, i.e. mist. According to an advantageous embodiment of the invention, all or substantially all of the water (i.e. at least 80%, more preferably at least 90% of the water) used in the method is supplied together with the chemicals to be added to the system. Most preferably all or substantially all of the water (i.e. at least 80%, more preferably at least 90% of the water) is dosed together with the alkalizing agent. According to an example embodiment of the invention, a solution of 15 to 40% or 20 to 40% of aqueous sodium hydroxide is sprayed into the system.

According to an advantageous embodiment of the invention, the first chemical inlet 3 for the first chemical comprises at least one sprayer, preferably at least three or at least four sprayers. There are advantageously many inlets because, due to the high dry matter content of the used cellulose raw material 1, it may be the easiest way to mix the chemical and the cellulose raw material with each other during the dosage of the chemical.

The second chemical may be added to the system using the second chemical inlet 7. The first chemical is preferably added before the addition of the second chemical, or partly or wholly simultaneously with the addition of the second chemical. Advantageously at least the first chemical is dosed before the sieve plate press 6. The used chemicals are preferably conveyed to the first chemical feeding point 3 and to second chemical feeding point 7 from a dosage unit, which dosage unit for chemicals comprises several storage chests. Most preferably, dosing of the second chemical is implemented before the sieve plate press 6.

According to an example embodiment of the invention, a third chemical, for example $H_2O_2$, is added to the system in order to control (i.e. to decrease) the degree of substitution of the cellulose material.

According to an example embodiment of the invention, the temperature of the sieve plate press 6 can be controlled. Due to the thermal energy produced in the sieve plate press and/or introduced in the system from the outside, the temperature of the mixture comprising cellulose fibers and water can be raised to such a level that the actual reaction can be started and at least partly performed in the sieve plate press 6. The temperature of the mixture in the sieve plate press 6 may be at least 60° C., preferably at least 80° C. The temperature of the mixture may be not higher than 220° C. or not higher than 180° C., preferably not higher than 150° C. or not higher than 120° C., more preferably not higher than 110° C. and most preferably not higher than 105° C.

According to an advantageous embodiment of the invention, the system comprises a heating device 11, such as a heating chest or an oven. The heating device is preferably placed after the sieve plate press 6, i.e. the cellulose material is advantageously conveyed to the heating device after the treatment in the sieve plate press 6. The heating chest may be, for example, a cylindrical chest having a conical bottom and it may comprise a vibratory discharger and/or a mixer.

The temperature of the heating device 11 is preferably kept between 50 and 200° C., more preferably between 70 and 120° C. and most preferably between 80 and 110° C., to allow the carboxymethylation reaction to take place in the heating device 11.

In an aspect of the invention, the total processing time in the heating device 11 (the time the mixture is held in the heating device) is between some minutes and 3 h, preferably between 5 min and 2 h. It may be possible to add at least one chemical to the heating device.

According to an advantageous embodiment of the invention, the consistency of the mixture in the heating device 11 is, at least momentarily, at least 70% or at least 80%, more preferably at least 90%, for example between 90% and 96%.

After the heating step in the heating device 11 and/or in the sieve plate press 6, the produced cellulosic material is preferably washed to remove any excess chemical, such as residual salts, from the treated pulp. For the washing treatment 9, the pulp is preferably first diluted in a dilution step 9a, preferably with water, after which the dry matter content of the produced material is increased in the a drying step 9b.

This can be done, for example, by using a filtrating device, and/or a centrifugal apparatus, and/or a pressing device. The consistency of the material during the dilution step is preferably between 2 and 10%, for example between 4 and 6%. The process may comprise several washing treatment steps with the dilution step and the drying step within every step. Preferably the process comprises 1 to 4 washing treatment steps, more preferably 2 to 3 washing treatment steps. The washing treatment is preferably implemented before the possible refining treatment of the anionized cellulose material in order to increase the refining efficiency. According to an example embodiment of the invention, the filtrate of the washing step 9 is collected and, preferably, recycled. The concentration of the chemical(s) in the filtrate may be increased and/or the filtrate may be cleaned before recycling. The treatments of the filtrate may be carried out in the chemical dosage unit.

After said heating step and/or said washing step, the cellulosic material may be refined in at least one refiner 8 in order to manufacture fibril cellulose. Therefore, the system advantageously comprises at least one refiner 8, which is placed after the sieve plate press 6.

In an embodiment, the dry matter content of the cellulosic material may be controlled, i.e. increased or decreased, and/or the cellulosic material may be predispersed in water before the material is lead to said at least one refiner 8.

The refiner(s) 8 may be, for example, a disc refiner and/or a conical refiner. In an aspect of the invention, at least one refiner 8 is a grinder, a homogenizer, a colloider, a friction grinder, a fluidizer or an ultrasound sonicator. There are preferably 0 to 2 refiners 8. Advantageously there is one refining step in the process in order to refine the cellulosic material into fibril cellulose.

The consistency of the material in the refining 8 is preferably between 1-30%, more preferably between 2 and 15%. In an example, the consistency of the material in the refining 8 is between 2 and 4% or between 10 and 20%.

The refiner 8 is preferably used to refine the produced cellulosic material into fibril cellulose material. The manufactured fibril cellulose material may be treated with a finishing device 10, such as a heating device, for example an oven. Advantageously, the manufactured fibril cellulose pulp is dried in order to achieve dry matter content of at least 20%, more preferably at least 50% and most preferably at least 90%.

The method according to an example embodiment of the invention comprises preferably at least some of the following steps:

Introducing cellulose fibers as raw material pulp 1 to a system.

Refining the cellulose fibers 1 with a prerefiner 2a, for example with a disk refiner, a fluffing machine or a hammer mill.

Increasing the dry matter content of the raw material pulp 1 using a predryer 2b.

Dosing a first chemical and the second chemical to the system before a sieve plate press 6 and/or in the sieve plate press 6 in order to absorb the dosed chemical into the cellulose fibers 1. Preferably the dosage of the chemicals is carried out in a fluidized bed type mixer.

Conveying the cellulose fibers 1 to the sieve plate press 6.

Performing a reaction between the cellulose fibers and at least one chemical in order to produce anionic cellulosic material having such a degree of substitution that it is not soluble in water. The reaction is performed preferably at the sieve plate press 6 and/or in the heating device 11, advantageously at a consistency of at least 50%, preferably at least 60%, more preferably at least 70% and most preferably at a consistency of at least 75%.

Using a heating device 11 in order to achieve a predetermined reaction temperature, reaction time and/or retention temperature.

Washing the material, i.e. preferably diluting the produced mixture and filtrating the mixture.

Conveying the produced cellulosic material to a refiner 8.

Refining the produced cellulosic material in the refiner 8 in order to produce fibril cellulose material.

Increasing the dry matter content of the produced fibril cellulose material in such a way that the dry matter content is at least 60%, preferably at least 70%.

Redispersing the fibril cellulose in water in order to use the produced fibril cellulose.

Thanks to the embodiments of the present invention, it is possible to improve the efficiency of the fibrillation process. For example, it is possible to lower the energy consumption in the fibril cellulose manufacturing process. For example, the refining step of fibril cellulose may be very efficient. Due to the high dry matter content used in one embodiment of the process, it is possible to reduce the amount of the chemicals used and thereby to reduce the chemical costs. In addition, it is also possible to increase the production efficiency because, thanks to the high dry matter content used, the needed volume for certain amount of produced fibril cellulose decreases. The efficiency may be still increased if the process comprises the washing step of the produced pulp.

The produced fibril cellulose may be dried into a dry powder. Advantageously, the dry matter content of the produced fibril cellulose is increased for transportation and/or for storing. Said dried fibril cellulose can advantageously be redispersed in water (or another liquid) before the usage of said fibril cellulose. The fibril cellulose is redispersable in the liquid if the viscosity of the redispersed fibril cellulose is at least 70%, preferably at least 80% of the viscosity mentioned in the Table 1.

The produced fibril cellulose may be used, for example, in paper manufacturing, in natural composite manufacturing, in the pharmaceutical industry or in food processing.

The manufactured fibril cellulose advantageously has:
a turbidity below 200 NTU, preferably between 25 to 100 NTU as measured at 0.1% concentration in water, and/or
a zero shear viscosity of 5000 to 100 000 Pas measured at a 0.5% concentration in water, and/or
a yield stress of 4-80 Pa, preferably 10-40 Pa as measured at 0.5% concentration in water.

The treatment described in this application may give very good DP (degree of polymerization) of the cellulosic material; thus, the fibril cellulose manufactured from the cellulosic material according to the present invention may have very good strength properties.

Example 1

In the example, different cellulose fiber types were used with various chemical contents. The mechanical working was carried out by means of a sieve plate press with several runs through. After the treatment in the sieve plate press, fibrillation of the manufactured cellulosic material was conducted by Masuko Sangyo's Super masscolloider MKZA10-15J.

Figure 3A:
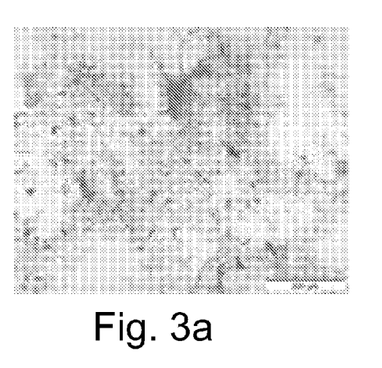
FIGS. 3a-3d and 4a-4d show photos of experimental tests.
Figure 3B:
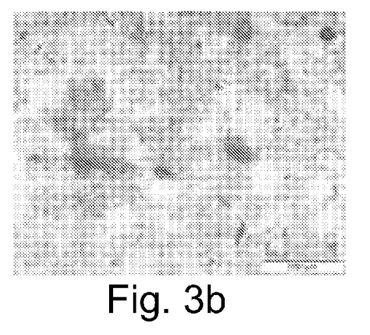
Figure 3C:
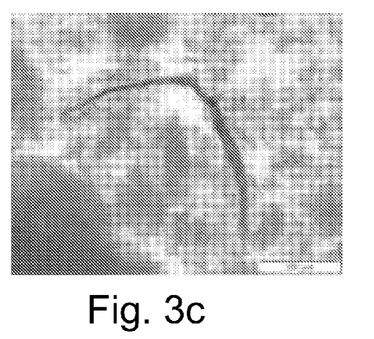
Figure 3D:
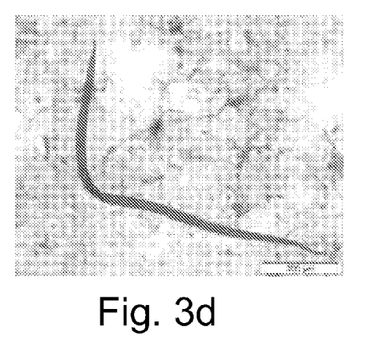

In a trial, the target was to reach DS levels between 0.05 and 0.20. Table 2 shows the results achieved by using the method according to the present invention. In addition, FIGS. 3a-3d show photomicroscopic images. FIG. 3a shows the test sample 1, FIG. 3b shows the test sample 2, FIG. 3c shows the test sample 3, and FIG. 3d shows the reference sample.

Exact formulas for synthesis of carboxymethylated (CM) fibres with a DS range of 0.05-0.20 are presented in Table 2. A formula is presented for one single batch. In the Table 2, the following abbreviations are used:
SMCA=sodium monochloroacetate (powder), and
Mech x=number of cycles in mechanical processing.

TABLE 2

Test samples

| test | NaOH vs cell % | SMCA vs cell % | mech x | oven temperature C./ time h | DS | fibrillation throughput × N | gel turbidity | fibers/ mg | Brook field/ 10 rpm | kWh/kg |
|---|---|---|---|---|---|---|---|---|---|---|
| 1 | 1 | 2 | 5 | 110/1 | 0.05 | 2 | 726 | | 2259 | 11 |
| 2 | 3 | 7 | 2 | 101/1.5 | 0.16 | 2 | 147 | 626 | 5347 | 17 |
| 3 | 8 | 14 | 4 | 105/1.5 | 0.19 | 2 | 73 | 1017 | 17123 | 26 |

In addition, a reference sample was tested after mechanical treatment. The reference sample was chemical birch pulp that was treated two times with the Masuko refiner. The reference sample had turbidity at 410 NTU, and the amount of fibers was 13 412 fibers/mg. The viscosity was measured at the 1.5% consistency and was 16 000 mPas. The consistency of the viscosity measurement differed from other samples because the viscosity of the reference sample could not be measured at the consistency of 0.8%.

A method based on accurate high resolution microscopy and image analysis was developed for the quantitative determination of micro- and nanoscale fibers of fibril cellulose whereby the unfibrillated fiber-like material was determined in the fibril cellulose as follows. The amount of detectable fibers or fiber-like particles within a known amount of pulp sample was measured, and the rest of the sample was then regarded as belonging into the non-detectable category, i.e. micro- and nanoscale particles. Commercial fiber analyzers can be used for characterizing the unfibrillated fiber-like material in fibril cellulose. For example, Kajaani Fiberlab and FS-300 devices are suitable, however, other similar fiber analyzers with similar detection resolution can be also used. Results of "Fibers/mg" in Table 2 are based on Kajaani Fiberlab measurements.

Example 2

The processing stages in this dry carboxymethylation test series were the following:

1. Coarse grinding with Rapid knife mill with screen plate mesh 10 mm. Fine grinding was performed by Rivakka hammer mill with screen plate mesh D 3 mm 2. Premix with Forberg: first cellulose, then SMC-solution by spraying and rotating the mixer 30 s, and finally NaOH-solution by spraying and rotating mixer extra 30 s.

3. Mechanical compacting with smaller scale modified Kahl compactor; running 4 times through the device 4. Reaction in flow-through oven with settings T=105° C. and t=60 min 5. Final grinding with knife mill Polymix PX-MFC 90D with screen plate mesh 2 mm 6. Wash inside a washing bag neutralization in the first wash; repeated 3 times.

Example 2 was repeated using various alkalizing agent and anionic agent amounts with respect to cellulose for different DS targets. The data are given in Table 3 below.

Figure 4A:
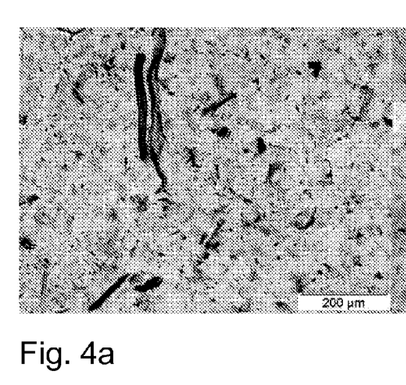
Figure 4B:
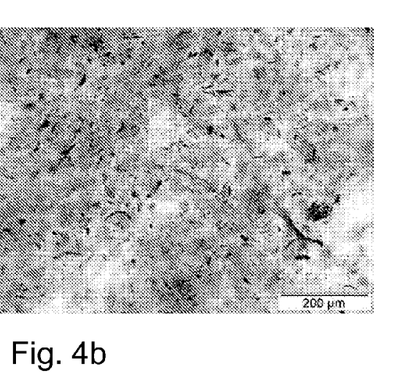
Figure 4C:
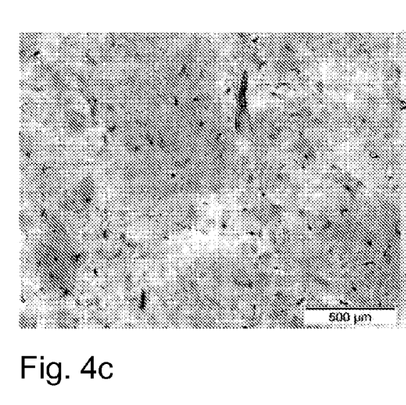
Figure 4D:
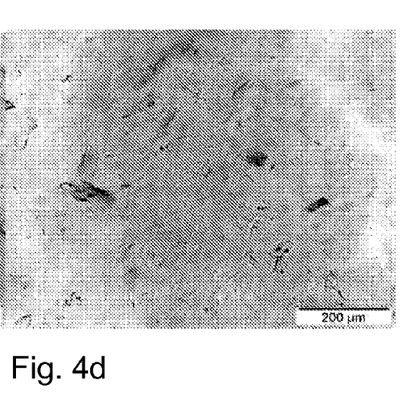

FIGS. 4a-4d show photomicroscopic images of the fibril cellulose material obtained in Example 3. FIG. 4a shows material with DS Of 0.07, FIG. 4b: DS 0.11, FIG. 4c: DS 0.16, and FIG. 4d: DS 0.19.

TABLE 4

Summary of routine characterisations of fibril cellulose material obtained

| DS meas. | Turbidity | pH | Cons. [%] | mPas, 10 rpm | kWh/kg |
|---|---|---|---|---|---|
| 0.07 | 237 | 7.3 | 2.11 | 3119 | 5 |
| 0.11 | 92 | 7.2 | 1.48 | 7989 | 10 |
| 0.16 | 55 | 7.5 | 1.62 | 6270 | 11 |
| 0.19 | 50 | 8.0 | 2.52 | 10930 | 7 |

As can be seen in the images and the numerical data, higher DS results in enhanced fibrillation, which in turn gives brighter fibril cellulose material (lower turbidity) with higher gel strength (higher viscosity).

Example 4

The effect of reaction time and temperature was tested at target DS level of 0.25 using larger scale Kahl for the mechanochemical treatments. The reaction conditions used in these experiments with larger scale Kahl compactor and the chemical charges obtained are given in Tables 5 and 6.

TABLE 5

The chemical amounts and reaction conditions used in experiments with larger scale Kahl compactor.

| DS target | NaOH/Cell % | SMC/Cell % | Dry mat content % | Temp, ° C. | Time, min | Compactor cycles | Grinding |
|---|---|---|---|---|---|---|---|
| 0.25-A | 6.7 | 18 | 75.9 | RT | 0 | 4 | Coarse |
| 0.25-B | 6.7 | 18 | 98.8 | 80 | 60 | 4 | Coarse |
| 0.25-C | 6.7 | 18 | 98.4 | 100 | 40 | 4 | Coarse |
| 0.25-D | 6.7 | 18 | 98.5 | 120 | 20 | 4 | Coarse |
| 0.25-E | 6.7 | 18 | 94.6 | 140 | 10 | 4 | Coarse |

TABLE 3

The chemical amounts relative to cellulose and reaction conditions used in experiments with smaller scale modified Kahl compactor.

| DS target | NaOH/Cell % | SMC/Cell % | DS potentiom | Efficiency, % | Charge, mmol/g* |
|---|---|---|---|---|---|
| 0.1 | 3 | 7 | 0.07 | 70 | 0.30 |
| 0.15 | 4.5 | 11 | 0.11 | 73 | 0.45 |
| 0.20 | 6 | 14 | 0.16 | 80 | 0.64 |
| 0.25 | 7.5 | 18 | 0.19 | 76 | 0.77 |

DS values and charge were determined using potentiometric and conductometric titrations.

Example 3

The samples from the DS test series of example 2 were fibrillated in Masuko Super masscolloider MKZA10-15J using one pass. All the samples were diluted with tap water and predispersed for 10 minutes at 700 rpm in Diaf dissolver 100 WH.

Routine characterisation was done using turbidity, Brookfield viscosity, optical microscopy and pH. The amount of unfibrillated or fibre particles seemed to decrease gradually as a function of DS. The results are presented in table 4.

Target DS level 0.25 could be reached by mechanochemical treatment when larger scale Kahl was used and ethanol washing was performed. The target DS could be obtained already during compacting, and additional oven treatment was not necessary.

TABLE 6

Effect of ovening time and temperature on reaction efficiency (ethanol/water 70/30 washing).

| DS target | DS measured | Efficiency, % | Temp, ° C. | Time, min | Compactor cycles | Grinding |
|---|---|---|---|---|---|---|
| 0.25-A | 0.24 | 96 | RT | 0 | 4 | Coarse |
| 0.25-B | 0.25 | 100 | 80 | 60 | 4 | Coarse |
| 0.25-C | 0.24 | 96 | 100 | 40 | 4 | Coarse |
| 0.25-D | 0.21 | 84 | 120 | 20 | 4 | Coarse |
| 0.25-E | 0.22 | 88 | 140 | 10 | 4 | Coarse |

The results of table 6 show that the ovening can be used as option in the process, but it is not absolutely necessary.

Example 5

The effect of compactor cycles (1-4 cycles) on reaction efficiency was evaluated at lower target DS level of 0.1. The high reaction efficiency was demonstrated also at lower DS level of 0.1. The target DS was nearly reached already after first round of compacting (DS 0.093), and only minor increase in DS (DS 0.96) was detected by additional compactor cycles or additional heating.

TABLE 7

Effect of compactor cycles on reaction efficiency (ethanol/water 70/30 washing).

| DS target | DS measured | Efficiency, % | Compactor cycles |
|---|---|---|---|
| 0.1 | 0.093 | 93 | 1 |
| 0.1 | 0.096 | 96 | 2 |
| 0.1 | 0.094 | 94 | 3 |
| 0.1 | 0.096 | 96 | 4 |

For Target DS = 0.1 level, chemical amounts (NaOH/cellulose 3% and SMS/cellulose 7%) and reaction conditions presented in Example 2 were used.

Example 6

The samples having DS=0.09 and DS=0.22 were fibrillated using different fibrillating devices and gel properties of nanofibrillar celluloses were measured using rheometer. Masuko Sangyo's Super masscolloider MKZA10-15J was used to fibrillate both samples (0.09-M and 0.22-M), GEA Niro Soavi Panther NS3006 L (600 bar pressure, 3 passes) was used to fibrillate DS=0.22 sample (0.22-H) and Atrex dispergator was used to fibrillate DS=0.09 sample (0.09-A).

The NFC was diluted with deionised water to a concentration of 0.5 or 1% and 200 g of the mixture was homogenised with a Büchi-mixer (B-400, max 2100 W, Büchi Labortechnik AG, Switzerland) for 3×10 s.

The viscosity of the NFC dispersions was measured at 22° C. with a stress controlled rotational rheometer (AR-G2, TA Instruments, UK) equipped with a narrow gap vane geometry (diameter 28 mm, length 42 mm) in a cylindrical sample cup having a diameter of 30 mm. After loading the samples to the rheometer they were allowed to rest for 5 min before the measurement was started. The steady state viscosity was measured with a gradually increasing shear stress (proportional to applied torque) and the shear rate (proportional to angular velocity) was measured. The reported viscosity (=shear stress/shear rate) at a certain shear stress was recorded after reaching a constant shear rate or after a maximum time of 2 min. The measurement was stopped when a shear rate of 1000 s$^{-1}$ was exceeded.

Figure 5:
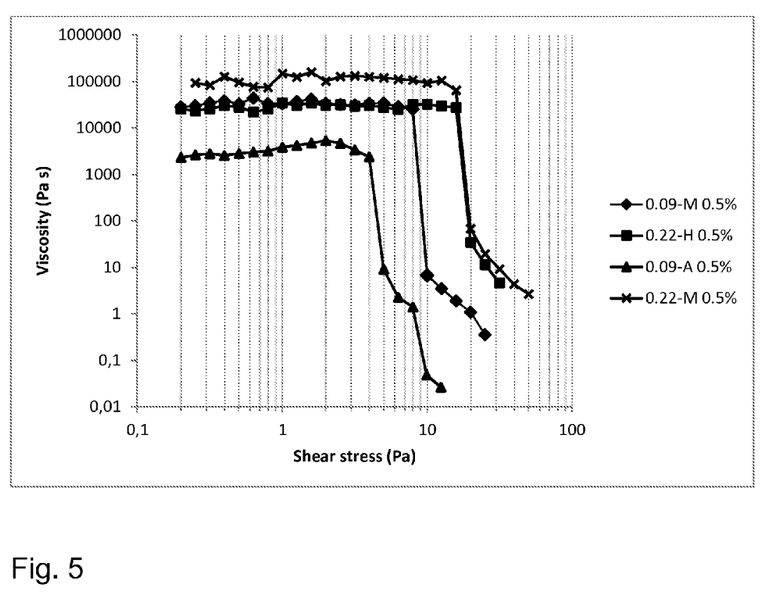
FIGS. 5-6 show graphs of viscosity measurements of obtained fibril cellulose samples.

FIG. 5 shows the dependency of the measured steady state viscosity of the different samples on the shear stress at a measuring consistency of 0.5%. As can be seen, the zero shear viscosity of at least 15000 Pa·s, even at least 20000 Pa·s can be reached at lower degrees of substitution as well. This indicates a high gel strength, which makes the material well applicable as stabilisator. The yield stress (the shear stress at which the shear thinning behavior starts) at the consistency of 0.5% in water is above 10 Pa at DS above 0.22 (samples 0.22-H and 0.22-M).

Figure 6:
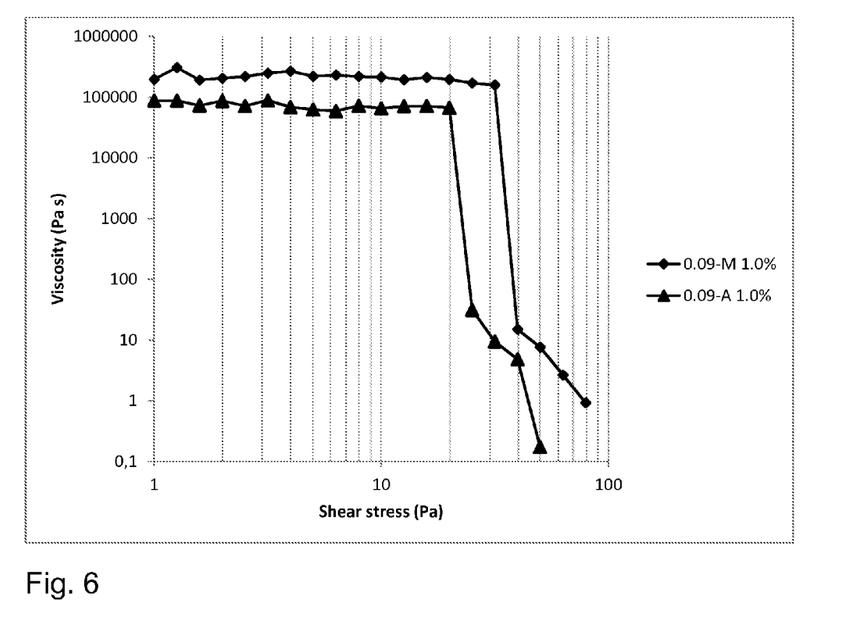

FIG. 6 shows the dependency of the measured steady state viscosity of two different samples of low degree of substitution (DS=0.09) on the shear stress at a measuring consistency of 1.0% in water. At this consistency the yield stress is at least 20 Pa even with a sample of poorer fibrillation (0.09-A), whereas with a sample of better fibrillation it is at least 30 Pa.

All test indicate that a fibril cellulose material of more uniform quality can be obtained with the method.

The order of adding the anionic agent and alkalizing agent can be varied. The alkalizing agent can be added before or after the anionic agent, or both agents can be added at least partly simultaneously.

A person skilled in the art will readily understand that the different embodiments of the invention may have applications in environments where optimization of the fibril cellulose material production is desired. Therefore, it is obvious that the present invention is not limited solely to the above-presented embodiments, but it can be modified within the scope of the appended claims.

The invention claimed is:

1. A method for manufacturing cellulose material, the method comprising:
   introducing cellulose fibers as cellulose raw material to a system,
   adding an alkalizing agent into the system in order to absorb the alkalizing agent into the cellulose fibers,
   adding an anionic agent into the system in order to absorb said agent into the cellulose fibers, said anionic agent being monochloracetic acid or a salt thereof,
   feeding the cellulose fibers to a sieve plate press,
   performing a reaction between the cellulose fibers and the anionic agent at least partly in the sieve plate press in order to produce water-insoluble carboxymethylated cellulose fibers having a degree of substitution between 0.05 and 0.35 carboxymethyl groups per anhydroglucose unit, wherein the reaction is performed at least partly at a consistency of at least 50%.

2. The method according to claim 1, further comprising:
   refining the carboxymethylated cellulose fibers in a refiner in order to produce fibril cellulose material.

3. The method according to claim 1, wherein the alkalizing agent is sodium hydroxide and the anionic agent is sodium monochloroacetate.

4. The method according to claim 1, wherein the addition of the alkalizing agent and the anionic agent is carried out in a fluidized bed type mixer.

5. The method according to claim 1, wherein the amount of the alkalizing agent is between 1 and 20 w-%, from dry weight of the used cellulose raw material.

6. The method according to claim 1, wherein the amount of the anionic agent is between 1 and 30 w-%, from dry weight of the used cellulose raw material.

7. The method according to claim 1, wherein at least 80% of water used in the method is supplied together with chemicals to be added into the system.

8. The method according to claim 1, wherein at least 80% of water used in the method is supplied together with the cellulose raw material.

9. The method according to claim 1, the method further comprising:
   heating the mixture of the cellulose fibers, the alkalization agent, and the anionic agent at a temperature between 50 and 200° C. in order to perform a reaction between the cellulose fibers and the anionic agent.

10. A system for manufacturing cellulose material, the system comprising
    means for introducing cellulose fibers to the system,
    a sieve plate press,
    means for dosing at least two chemicals to the system before the sieve plate press and/or in the sieve plate press, one of the chemicals being an alkalizing agent and the other being monochloracetic acid or a salt thereof,
    a feeding device for feeding the cellulose fibers to the sieve plate press, and means for performing a reaction between the cellulose fibers and the chemical or the chemicals at a consistency of at least 50% in order to produce water-insoluble carboxymethylated cellulose fibers having a degree of substitution between 0.05 and 0.35 carboxymethyl groups per anhydroglucose unit.

11. A system according to the claim 10, the system further comprising a refiner in order to refine the water-insoluble carboxymethylated cellulose fibers into fibril cellulose.

12. A fibril cellulose material produced from the carboxymethylated cellulose fibers manufactured according to claim 1, the fibril cellulose material having:
   a degree of substitution between 0.05 and 0.35 carboxymethyl groups per anhydroglucose unit,
   a turbidity below 200 NTU, as measured at 0.1% concentration in water,
   a zero shear viscosity of 5000 to 100 000 Pa s measured at a 0.5% concentration in water, preferably at least 15000 Pa s, and
   a yield stress of 4-80 Pa, as measured at a 0.5% concentration in water.

13. The fibril cellulose according to claim 12, wherein the fibril cellulose has a yield stress equal to or higher than 20 Pa, as measured at a 1.0% concentration in water.

14. The method according to claim 2, wherein the alkalizing agent is sodium hydroxide and the anionic agent is sodium monochloroacetate.

15. The method according to claim 2, wherein the amount of the alkalizing agent is between 1 and 20 w-% from dry weight of the used cellulose raw material.

16. The method according to claim 2, wherein the amount of the anionic agent is between 1 and 30 w-% from dry weight of the used cellulose raw material.

17. The method according to claim 1, wherein the amount of the alkalizing agent is between 1 and 10 w-% from dry weight of the used cellulose raw material.

18. The method according to claim 1, wherein the amount of the anionic agent is between 2 and 15 w-% from dry weight of the used cellulose raw material.

19. The fibril cellulose material according to claim 12, the fibril cellulose material having:
   a turbidity between 25 to 100 NTU as measured at 0.1% concentration in water
   a zero shear viscosity of at least 15000 Pa s measured at a 0.5% concentration in water
   a yield stress of 10-40 Pa as measured at a 0.5% concentration in water.

20. The fibril cellulose material according to claim 19, the fibril cellulose material having:
   a zero shear viscosity of at least 20000 Pa s measured at a 0.5% concentration in water.

* * * * *